(12) United States Patent
Kamamoto et al.

(10) Patent No.: US 8,636,611 B2
(45) Date of Patent: Jan. 28, 2014

(54) POWER TRANSMISSION CHAIN AND POWER TRANSMISSION APPARATUS

(75) Inventors: Shigeo Kamamoto, Kashiwara (JP); Seiji Tada, Kashiba (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 284 days.

(21) Appl. No.: 12/285,986

(22) Filed: Oct. 17, 2008

(65) Prior Publication Data
US 2009/0105026 A1 Apr. 23, 2009

(30) Foreign Application Priority Data
Oct. 22, 2007 (JP) ................. P2007-273317

(51) Int. Cl.
*F16G 1/22* (2006.01)
*F16G 5/16* (2006.01)

(52) U.S. Cl.
USPC .......................................... 474/245; 474/244

(58) Field of Classification Search
USPC ......... 474/242, 244, 245, 272, 228, 229, 230, 474/237
See application file for complete search history.

(56) References Cited

U.S. PATENT DOCUMENTS

| 4,344,761 A | 8/1982 | Steuer |
| 4,718,880 A | 1/1988 | Zimmer |
| 2005/0187057 A1* | 8/2005 | Lou ............................ 474/245 |
| 2008/0161148 A1 | 7/2008 | Tada et al. |

FOREIGN PATENT DOCUMENTS

| JP | 2006-234019 A | 9/2006 |
| JP | 2006-242374 | 9/2006 |
| JP | 2007-255544 A | 10/2007 |

OTHER PUBLICATIONS

European Search Report issued Aug. 22, 2011.
Notification of Reason for Refusal dated Nov. 28, 2011, with English translation.

* cited by examiner

*Primary Examiner* — Sang Kim
*Assistant Examiner* — Juan Campos, Jr.
(74) *Attorney, Agent, or Firm* — McGinn IP Law Group, PLLC

(57) ABSTRACT

A power transmission chain including a plurality of links each having front and rear insertion through holes through which pins are inserted, and a plurality of first pins and a plurality of second pins which are arranged in a line for connecting together the links which are arranged in a chain width direction. The links are made up of links of small pitch length and links of large pitch length. The links of large pitch length corresponding to the first pin or the second pin that is clamped by the pulley are arranged such that the links of large pitch length are always included in one to one-half in total when a winding contact diameter of the pulley is a minimum operation radius.

7 Claims, 4 Drawing Sheets

$1 \leq$ NUMBER OF LONG LINKS L $\leq$ N/2
N: NUMBER OF CLAMPED PINS

1 ≤ NUMBER OF LONG LINKS L ≤ N/2
N: NUMBER OF CLAMPED PINS

POWER TRANSMISSION CHAIN AND POWER TRANSMISSION APPARATUS

BACKGROUND OF THE INVENTION

1. Field of the Invention

The present invention relates to a power transmission chain and more particularly to a power transmission chain and a power transmission apparatus which are suitable for a continuously variable transmission (CVT) of a vehicle such as an automotive vehicle.

2. Related Art

As an automotive continuously variable transmission, there is known an automotive continuously variable transmission, as is shown in FIG. 6, including a drive pulley (2) having a fixed sheave (2a) and a movable sheave (2b) and provided on an engine side, a driven pulley (3) having a fixed sheave (3b) and a movable sheave (3a) and provided on a drive wheel side and an endless power transmission chain (1) placed to extend between the pulleys, wherein by moving the movable sheaves (2b), (3a) towards and away from the fixed sheaves (2a), (3b) by means of a hydraulic actuator so as to clamp the chain by virtue of hydraulic pressure, so that a contact load is generated between the pulleys (2), (3) and the chain (1) by the clamping force so as to transmit torque by a frictional force generated at the contact portions between the pulleys and the chain.

As the power transmission chain, JP-A-2006-242374 proposes a power transmission chain including a plurality of links each having front and rear insertion through holes through which pins are inserted and a plurality of first pins and a plurality of second pins which are arranged in a line for connecting together the links which are arranged in a chain width direction such that the front insertion through hole of one link is associated with the rear insertion through hole of another link, a longitudinal bending of the links being enabled through relative rolling contact movement of the first pins which are fixed in the front insertion through hole of one link and fitted movably in the rear insertion through hole of another link and the second pins which are fitted movably in the insertion through hole of one link and fixed in the rear insertion through hole of another link, and wherein to reduce noise by differentiating a biting timing of the pins into the pulley, two or more pin rolling contact surface shapes and pin contact positions with the pulley surface (offset amounts) are used.

In the power transmission chain disclosed in JP-A-2006-242374 above, although noise can be reduced by combining the plurality of links which are different in pitch length and the pins which are different in shape, being at random in pitch (being at random in link arrangement) often increases a rotational angle change (wow, flutter) which causes noise, and when the pulley radius of the continuously variable transmission becomes a minimum operation radius, a total number of pins which are held between the sheave surfaces is reduced. Because of this, when the number of long links becomes relatively large under this condition, such an increase in the number of long links sometimes becomes disadvantageous in terms of durability. Conventionally, a proper arrangement of long links in a minimum operation radius of a pulley has not been taken into consideration.

SUMMARY OF THE INVENTION

An object of the invention is to provide a power transmission chain and a power transmission apparatus which can reduce noise further while increasing durability by properly disposing long links while taking a minimum operation radius of a pulley into consideration.

According to an aspect of the invention, there is provided a power transmission chain comprising:

a plurality of links each having front and rear insertion through holes through which pins are inserted, and a plurality of first pins and a plurality of second pins which are arranged in a line for connecting together the links which are arranged in a chain width direction such that the front insertion through hole of one link is associated with the rear insertion through hole of another link, a longitudinal bending of the links being enabled through relative rolling contact movement of the first pins and the second pins, wherein the links are made up of links of small pitch length and links of large pitch length, and opposite end faces of at least either of the first pins and the second pins are brought into contact with sheave surfaces of pulleys of a continuously variable transmission when the power transmission chain is placed to extend between the pulleys to thereby transmit power by a frictional force, wherein the long links are arranged such that at least one node of the long links is included in every predetermined number of the connected links forming a minimum operation radius over the power transmission chain.

According to another aspect of the invention, there is provided a power transmission chain comprising:

a plurality of links each having front and rear insertion through holes through which pins are inserted, and a plurality of first pins and a plurality of second pins which are arranged in a line for connecting together the links which are arranged in a chain width direction such that the front insertion through hole of one link is associated with the rear insertion through hole of another link, a longitudinal bending of the links being enabled through relative rolling contact movement of the first pins and the second pins, wherein the links are made up of links of small pitch length and links of large pitch length, and opposite end faces of at least either of the first pins and the second pins are brought into contact with sheave surfaces of pulleys of a continuously variable transmission when the power transmission chain is placed to extend between the pulleys to thereby transmit power by a frictional force, wherein the long links are arranged such that nodes of the long links are included in half or less in total in every predetermined number of the connected links forming a minimum operation radius over the power transmission chain.

In this specification, a "node" is a word corresponding to the number of pins which are held by (or which are clamped by) a pulley. When the number of pins which are clamped by the pulley is 10, it should be understood that the pins are counted as 10 nodes. When the node is used with respect to a link, it should be understood that a portion of the link which corresponds to one pin is counted as one node.

These power transmission chains are preferable for use in continuously variable transmissions for automotive vehicles or the like. In such continuously variable transmissions, speed ratios are made to change between an under drive (hereinafter, referred to as "U/D") with a maximum speed ratio which is suitable for use at the time of low-speed driving (as when a vehicle is started from rest) to an overdrive (hereinafter, referred to as "O/D") with a minimum speed ratio which is suitable for use at the time of high-speed driving, and an operation radius of a pulley changes. When the operation radius of the pulley is large, the number of pins which are held between sheave surfaces thereof is increased relatively, whereas when the operation radius of the pulley is small, the number of pins which are held between the sheave surfaces is decreased relatively. In consideration of the durability of the chain, a minimum operation radius is preferably taken into consideration in which the number of pins which are held between the sheave surfaces becomes smallest. The minimum operation radius corresponds to a winding contact radius of a drive pulley which is in an U/D state and a winding contact radius of a driven pulley which is in an O/D state.

A holding range is specified as extending from one circumferential end to the other circumferential end of a portion corresponding to a total number of pins (for example, 10 pins) which are held between the sheave surfaces, and when the holding range is expressed in terms of degree of the pulley, the holding range is substantially in the range of 150° to 16.0°.

In the power transmission chain of the invention, a reduction in noise and increase in durability are realized by paying attention to the number of long links which reside within the holding range of the pulley whose operation radius is smallest.

In the chain, for example, three rows of links each made up of a plurality of links of the same phase in the width direction are arranged in a traveling direction (a front to rear or longitudinal direction) so as to make a link unit, and a plurality of link units each made up of the three rows of links are connected in the traveling direction, and the number of links which are contained in each link row is made to differ from time to time.

The first aspect of the invention specifies a minimum node member of the long links which lie within the holding range of the pulley, and the second aspect of the invention specifies a maximum node number of the links which lie within the holding range of the pulley. The number of long links which lie within the holding range of the pulley is preferably those specified in the first aspect and second aspect of the invention, and even in the event that the number of long links is referred to as that specified in the first aspect of the invention or that specified in the second aspect of the invention, a noise reduction effect and durability increase effect can be obtained to predetermined extents.

By the use of two types of links which are different in pitch length, a cycle at which striking noise is generated is offset, whereby a peak of sound pressure level is reduced. Although no specific limitation is imposed on shapes of pins, at least one of combinations is preferably used of a relatively large rolling contact surface curvature and a relative small rolling contact surface curvature, a relatively long length and a relatively short length, and a relatively inward offset and a relatively outward offset with respect to a radial direction of the chain. Normally, a rolling contact surface of one of the first pin and the second pin is made into a flat surface, while a rolling contact surface of the other pin is formed into an involute curved surface which enables a relative rolling contact movement. However, the first pin and the second pin may each be such that a contact surface thereof is formed into a required curved surface.

It is preferable that one of the first pin and the second pin is fixed in a pin fixing portion provided in a front part of the front insertion through hole of one link and is movably fitted in a pin movable portion provided in a front part of the rear insertion through hole of another link, whereas the other of the first pin and the second pin is movably fitted in a pin movable portion provided in a rear part of the front insertion through hole of one link and is fixed in a pin fixing portion provided in a rear part of the rear insertion through hole of another link.

The pin is fixed in the pin fixing portion, for example, such that an outer circumferential surface of the pin is fitted in an inner edge of the pin fixing portion through mechanical press fit to be fixed therein. However, in place of this, the pin may be fixed in the pin fixing portion through shrink fitting or cooling fitting. The fitting and fixing of the pin is preferably implemented on edges (upper and lower edges) of a portion which intersects a longitudinal direction of the pin fixing portion at right angles. After the pin has been fitted and fixed in place in the way described above, by imparting a pretension at a pretension imparting step, a uniform and proper residual compression stress is imparted to the pin fixing portion (the pin press fit portion) of the link.

In the power transmission chain of the aspects of the invention, at least either of the first pins and the second pins is brought into contact with the pulley for power transmission through frictional force. In a transmission chain in which either of first pins and second pins is brought into contact with a pulley, either of the first pins and the second pins is made to be pins which are brought into contact with the pulley (hereinafter, referred to as "first pins" or "pins") when they are used in a continuously variable transmission, while the other pins are made to be pins which are not brought into contact with the pulley (referred to as inter-pieces or strips, and hereinafter, referred to as "second pins" or "inter-pieces).

The links are made of, for example, spring steel or carbon tool steel. The material of the links is not limited to the spring steel or carbon tool steel, and hence, other steels such as bearing steel may be used. In the link, the front and rear insertion through holes may be made up of independent through holes (a pillared link) or the front and rear insertion through holes may be made of a single through hole (a pillarless link). An appropriate material such as bearing steel is used as the material of the pins.

In addition, in this specification, while one longitudinal end side of the link is referred to as front whereas the other end side as rear, they are so referred as a matter of convenience, and hence, it does not always mean that the length direction of the link coincides with the longitudinal or front to rear direction of the link.

In the power transmission chain, either (the inter-piece) of the pins is made shorter than the other pin (the pin), and end faces of the longer pin are preferably brought into contact with conical sheave surfaces of the pulley of the continuously variable transmission, so as to transmit power via-frictional force produced by the contact. Each pulley is made up of a fixed sheave having a conical sheave surface and a movable sheave having a conical sheave surface which confronts oppositely the sheave surface of the fixed sheave, so as to hold the chain between the sheave surfaces of both the sheaves. Then, the movable sheave is moved by a hydraulic actuator so as to change an inter-sheave distance and hence a winding contact radius of the chain of the continuously variable transmission, whereby a continuously variable gear change can be implemented through smooth movements of the constituent members involved.

According to a further aspect of the invention, there is provided a power transmission apparatus including a first pulley having conical sheave surfaces, a second pulley having conical sheave surfaces, and a power transmission chain placed to extend between the first and second pulleys, wherein the power transmission chain is the power transmission chain that has been described just above.

This power transmission apparatus is preferable for use as a continuously variable transmission of a vehicle such as an automotive vehicle.

According to the power transmission chains and the power transmission apparatus of the aspects of the invention, by specifying the smallest number and/or largest number of the long links which lie within the holding range of the pulley by taking the minimum operation radius of the pulley into consideration, the long links are disposed properly, whereby not only can noise be reduced further but also the durability of the chain can be increased.

DETAILED DESCRIPTION OF THE PREFERRED EMBODIMENTS

Hereinafter, an embodiment of the invention will be described by reference to the drawings. When used in the following description, upper and lower are used based on a vertical positional relationship represented in FIG. 2.

Figure 1:
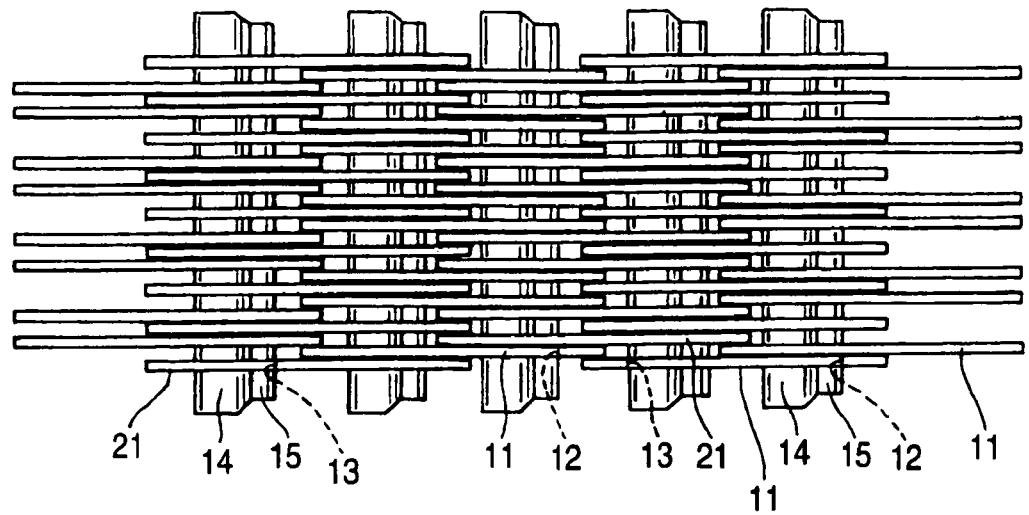
FIG. 1 is a plan view showing part of a first embodiment of a power transmission chain according to the invention.

FIG. 1 shows part of a power transmission chain according to the invention, and a power transmission chain (1) includes a plurality of links (11), (21) each having front and rear insertion through holes (12), (13) which are provided at a predetermined interval in a length direction of the chain and pluralities of pins (first pins) (14) and inter-pieces (second pins) (15) which connect the links (11), (21) which are arranged in a width direction of the chain in such a manner as to bend in the longitudinal direction. The inter-piece (15) is made shorter than the pin (14), and the inter-piece and the pin are made to face oppositely in such a state that the inter-piece (15) is disposed forwards whereas the pin (14) is disposed rearwards.

Figure 2:
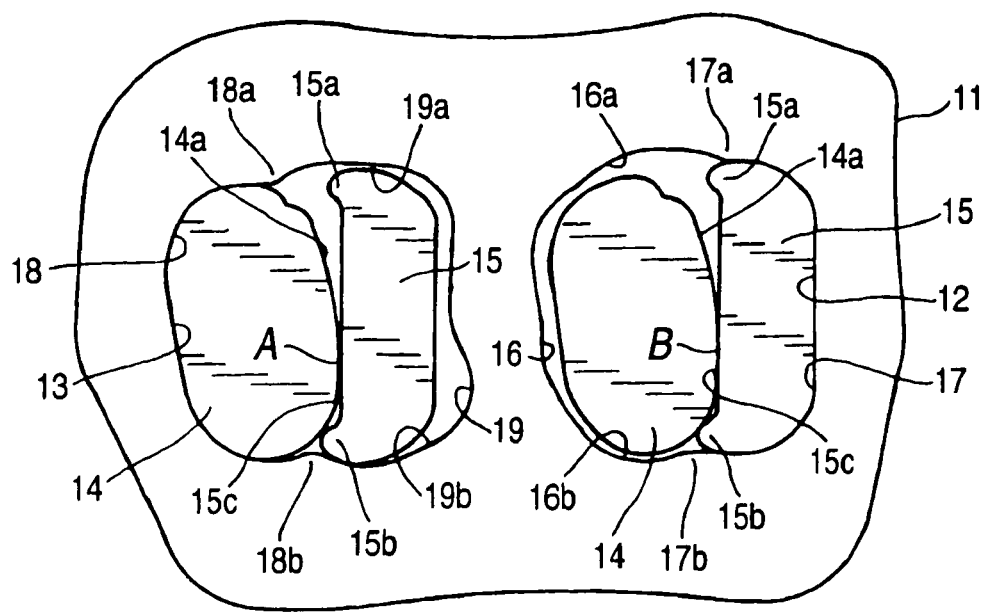
FIG. 2 is an enlarged side view showing basic shapes of a link, pin and inter-piece.
Figure 3:
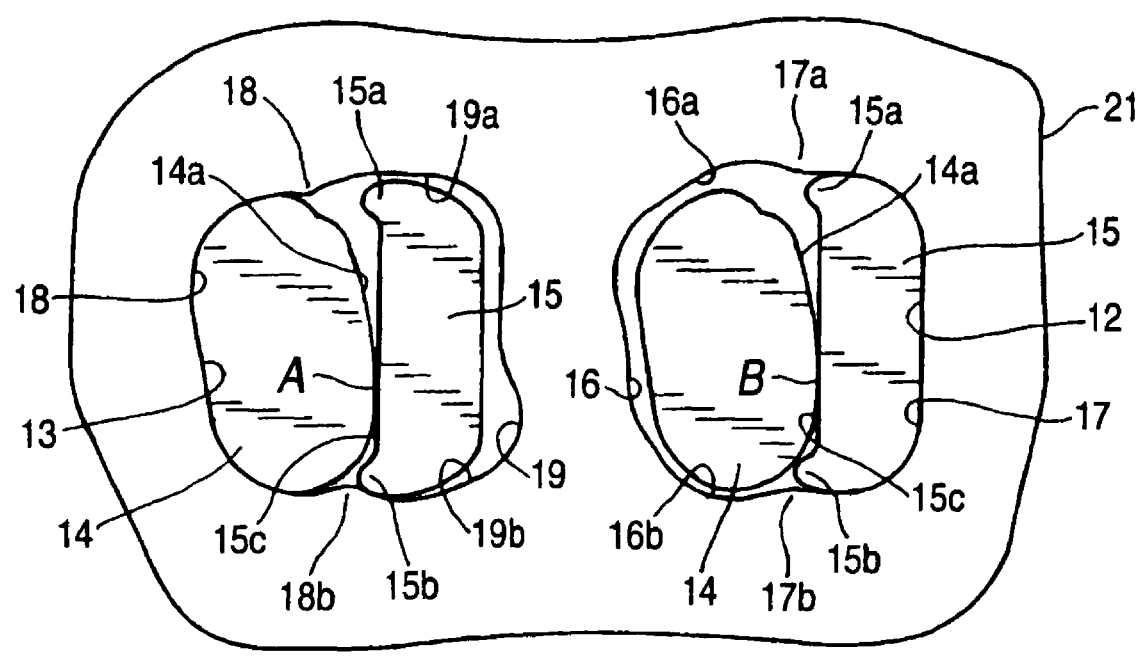
FIG. 3 is an enlarged side view showing a shape of a link having a different pitch length.

In the power transmission chain (1) of the invention, as to the links (11), (21), two types of links are prepared: a link (11) shown in FIG. 2 and a link (21) shown in FIG. 3.

In the chain (1), three rows of links each made up of a plurality of links of the same phase in the width direction are arranged in a traveling direction (a front to rear or longitudinal direction) so as to make a link unit, and a plurality of link units each made up of the three rows of links are connected in the traveling direction. In this embodiment, a link row of nine links and two link rows of eight links are made to make one link unit.

As is shown in FIGS. 2 and 3, the front insertion through hole (12) of the links (11), (21) is made up of a pin movable portion (16) into which the pin (14) is fitted movably and an inter-piece fixing portion (17) where the inter-piece (15) is fixed, whereas the rear insertion through hole (13) is made up of a pin fixing portion (18) where the pin (14) is fixed and an inter-piece movable portion (19) in which the inter-piece (15) is fitted movably.

Each pin (14) is made wider in the longitudinal direction than the inter-piece (15), and projecting edge portions (15a), (15b) are provided at upper and lower edge portions of the inter-piece (15) so as to extend to the pin (14) side.

When connecting the links (11), (21) which are arranged in the width direction of the chain, the links (11), (21) are stacked together such that the front insertion through hole (12) of one link (11), (21) is associated with the rear insertion through hole (13) of another link (11), (21), and the pin (14) is fixed in the rear insertion through hole (13) of one link (11), (21) and is fitted movably in the front insertion through hole (12) of another link (11), (21), whereas the inter-piece (15) is fitted movably in the rear insertion through hole (13) of one link (11), (21) and is fixed in the front fixing portion (12) of another link (11), (21). Then, by the pin (14) and the inter-piece (15) moving relatively through rolling contact, the links (11), (21) are allowed to bend in a length direction (a longitudinal direction).

Upper and lower convex arc-shaped holding portions (18a), (18b) are provided at a boundary portion between the pin fixing portion (18) and the inter-piece movable portion (19) of the link (11), (21) so as to be contiguous, respectively, to upper and lower concave arc-shaped guide portions (19a), (19b) of the inter-piece movable portion (19) and to hold the pin (14) which is fixed in the pin fixing portion (18). Similarly, upper and lower convex arc-shaped holding portions (17a), (17b) are provided at a boundary portion between the inter-piece fixing portion (17) and the pin movable portion (16) so as to be contiguous, respectively, to upper and lower concave arc-shaped guide portions (16a), (16b) of the pin movable portion (16) and to hold the inter-piece (15) which is fixed in the inter-piece fixing portion (17).

A locus of a contact position between the pin (14) and the inter-piece (15) based on the pin (14) is made into an involute of a circle, and in this embodiment, a rolling contact surface (14a) of the pin (14) is made into an involute curve having a base circle of a radius Rb and a center M in section, whereas a rolling contact surface (15c) of the inter-piece (15) is made into a flat plane (a sectional shape is a straight line). By this configuration, when each link (11), (21) shifts from a straight ling area to a curve area of the chain (1)) or from the curve area to the straight line area, in the front insertion through hole (12), the pin (14) moves within the pin movable portion (16) relative to the inter-piece (15) which is in the fixed state while the rolling contact surface (14a) of the pin (14) is being brought into rolling contact with the rolling contact surface (15c) of the inter-piece (15) (including slight sliding contact), whereas in the rear insertion through hole (13), the inter-piece (15) moves within the inter-piece movable portion (19) relative to the pin (14) which is in the fixed state while the rolling contact surface (15c) of the inter-piece (15) is being brought into rolling contact with the rolling contact surface (14a) of the pin (14) (including slight sliding contact).

Although polygonal vibration is generated by a pin repeating its vertical movement, this causing noise, in this power transmission chain (1), the pin (14) and the inter-piece (15) move relatively while in rolling contact with each other, and the locus of the contact position between the pin (14) and the inter-piece (15) based on the pin (14) is made into the involute of a circle, whereby vibration can be reduced to thereby reduce noise, compared with a case where both the contact surfaces of the pin and the inter-piece are formed into an arc-shaped surface.

Figure 5:
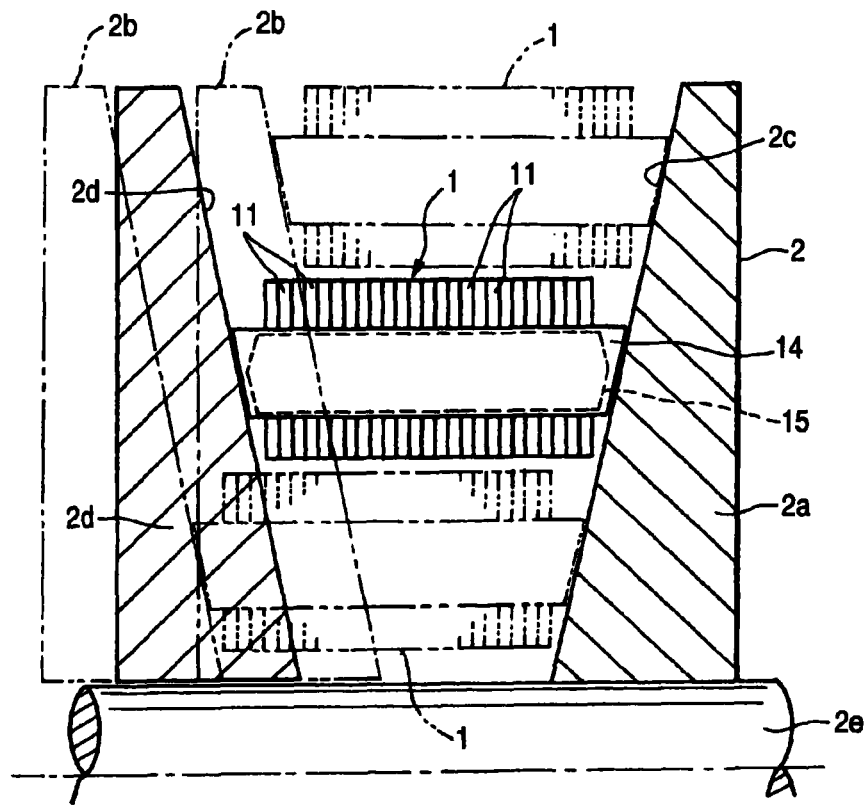
FIG. 5 is a front view showing a state in which the power transmission chain is mounted on a pulley.
Figure 6:
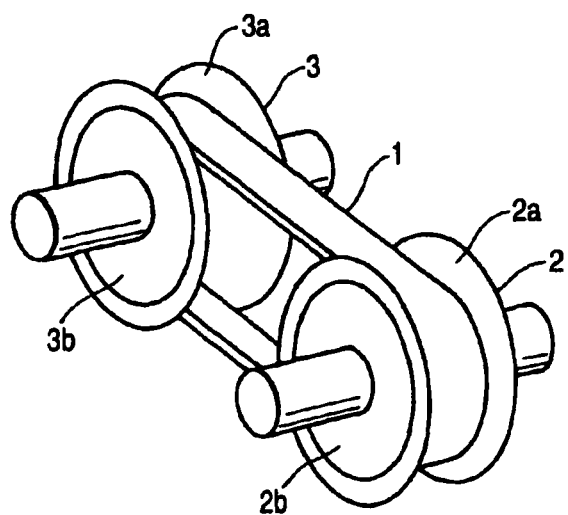
FIG. 6 is a perspective view showing a continuously variable transmission.

This power transmission chain (1) is used in a V-type pulley CVT shown in FIG. 6, and as this occurs, as is shown in FIG. 5, in such a state that (2), end faces of the inter-piece 15 do not contact respective conical sheave surfaces (2c), (2d) of a fixed sheave (2a) and a movable sheave (2b) of a pulley (2) having a pulley shaft (2e), end faces of the drive pin (14) contact the conical sheave surfaces (2c), (2d) of the pulley, and power is transmitted by a frictional force produced by the contact.

When the movable sheave (2b) of the drive pulley (2) which lies in a position indicated by solid lines is moved towards or apart from the fixed sheave (2a), a winding contact diameter of the drive pulley (2) is, as is shown by chain lines, increased when the movable sheave is moved towards the fixed sheave, whereas the winding contact diameter is reduced when the movable sheave is moved apart from the fixed sheave. Although the illustration thereof is omitted, in the driven pulley (3), a movable sheave moves in an opposite direction to the movable sheave (2b) of the drive pulley (2), and a winding contact diameter of the driven pulley (3) is reduced when the winding contact diameter of the drive pulley (2) is increased, whereas when the winding contact diameter of the drive pulley (2) is reduced, the winding contact diameter of the driven pulley (3) is increased. As a result of this, based on a state in which a speed ratio of one to one is achieved (an initial value), an U/D (under drive) state is obtained with a minimum winding contact diameter of the drive pulley (2) and a maximum winding contact diameter of the driven pulley (3), and an O/D (overdrive) state is obtained with a maximum winding contact diameter of the drive pulley (2) and a minimum winding contact diameter of the driven pulley (3).

In order to reduce noise and vibration further, two or more types of links (11), (21) having different pitch lengths and two or more types of pins (14) having different sectional shapes and end face shapes are preferably arranged at random, whereby a cycle at which striking noise is generated is offset to thereby be dispersed into frequency bands having different sound energies, to thereby reduce a peak of sound pressure level.

In FIGS. 2 and 3, portions denoted by reference characters A and B are a line (a point in section) where the pin (14) and the inter-piece (15) are in contact in the straight line area of the chain (1), and a distance between A and B is a pitch length. The link (21) in FIG. 3 is such that the distance between A and B (the pitch length) is increased relative to the link (11) shown in FIG. 2, and for the links (11), (21), a link of small pitch length (hereinafter, referred to as a "short link") and a link of large pitch length (hereinafter, referred to as a "long link") are both used.

The winding contact diameter of the drive pulley (2) which is in the U/D state and the winding contact diameter of the driven pulley (3) which is in the O/D state are minimum operation radii of the pulleys (2), (3), and when the diameters of the pulleys become the minimum operation radii of the pulleys, the total number of pins (14) which are held between the sheave surfaces (2c), (2d) becomes relatively small (which corresponds to a predetermined number of links forming a minimum operation radius), and in the event that the number of long links becomes relatively large under this condition, there may occur such a situation that the durability of the chain is disadvantageously deteriorated.

Figure 4:
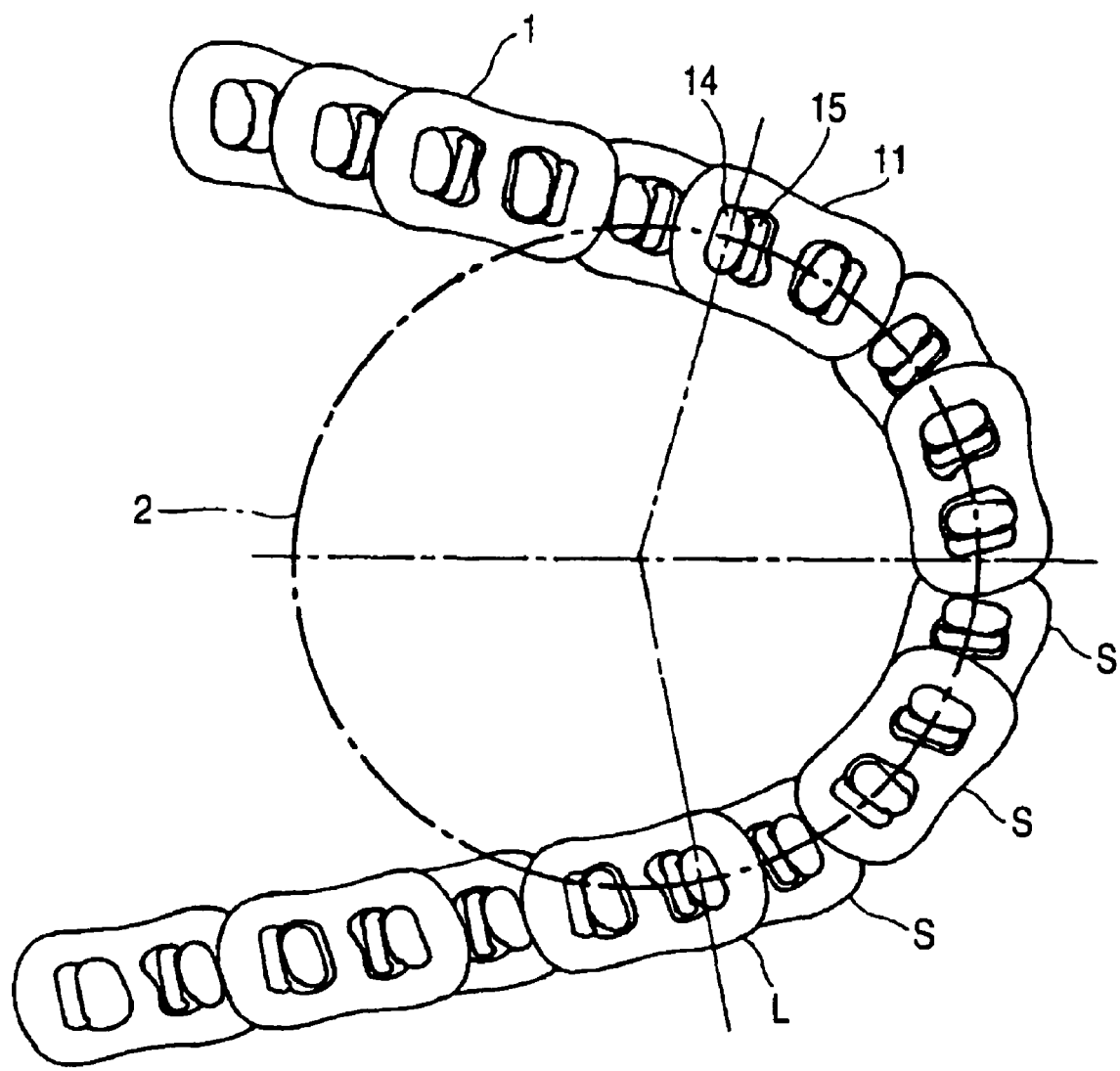
FIG. 4 shows an example of arrangement of short links and long links according to the invention.

FIG. 4 shows part of the chain (1) which wound round the pulley (2) whose operation radius is smallest. In FIG. 4, short links (denoted by "S") which are provided in a relatively large number and long links (denoted by "L") which are provided in a relatively small number are arranged almost at random, and 10 pins (14) are held between sheave surfaces (2c), (2d). When the short links S and the long links L are arranged at random, in addition to an opportunity in which the long links exist substantially uniformly between the short links S, there emerges an opportunity in which the 10 pins (14) so held are all or almost pins which fitted in the short links S while the chain (1) revolves once. Since the interval between the adjacent pins (14) becomes large in a location where the long link is disposed, when the number of long links lying within the holding range differs, there may emerge a possibility that noise is increased and the durability of the chain is reduced in association with the rotational angle being caused to change.

Then, in the invention, the number of long links L which changes within the holding range of the pulley (2) whose operation radius is smallest as the chain (1) travels is set as follows based on the number N of pins (14) which are clamped by the pulley.

1. A minimum node of the long link L is 1 (in the minimum operation radius, the long links L are made to be present one or more nodes).
2. A maximum node of the long link L is N/2 (in the minimum operation radius, the long links L are made to be half or less of the nodes which are clamped by the pulley).

By setting the number of long links in the ways described above, the noise and durability which are liable to be deteriorated in association with random arrangement of long links L can be maintained at a predetermined level or higher.

What is claimed is:

1. A power transmission chain configured so as to extend between pulleys to thereby transmit power by a frictional force, the power transmission chain comprising:
    a plurality of links each comprising front and rear insertion through holes through which pins are inserted; and
    a plurality of first pins and a plurality of second pins which are arranged in a line for connecting together the links which are arranged in a chain width direction such that the front insertion through hole of one link is associated with the rear insertion through hole of another link, a longitudinal bending of the links being enabled through relative rolling contact movement of the first pins and the second pins,
    wherein the links comprise links of small pitch length and links of large pitch length, and opposite end faces of at least either of the first pins and the second pins are brought into contact with sheave surfaces of the pulleys when the power transmission chain is placed so as to extend between the pulleys to thereby transfer power by the frictional force, wherein a pin held by one of the pulleys is referred to as a node, and
    wherein the links of large pitch length are arranged in the power transmission chain such that when a pulley of the pulleys is operating at a minimum radius thereof, a number of nodes of the links of large pitch length clamped by said pulley is in a range of one node to one-half of a total number of nodes clamped by said pulley along an entire length of the power transmission chain.

2. A power transmission apparatus comprising:
    a first pulley comprising conical sheave surfaces;
    a second pulley comprising conical sheave surfaces; and
    a power transmission chain disposed to extend between the first and second pulleys,
    wherein the power transmission chain is the power transmission chain set forth in claim 1.

3. The power transmission chain according to claim 1, wherein at least one of the first pins and the second pins comprises a plurality of different section shapes.

4. The power transmission chain according to claim 1, wherein at least one of the first pins and the second pins comprises a plurality of different end face shapes.

5. The power transmission chain according to claim 1, wherein the links of large pitch length are arranged in the power transmission chain such that when the pulley of the pulleys is operating at the minimum radius thereof, the number of nodes of the links of large pitch length clamped by said pulley is always in the range of one node to one-half of the total number of nodes clamped by said pulley.

6. A power transmission apparatus comprising:
    a first pulley comprising conical sheave surfaces;
    a second pulley comprising conical sheave surfaces; and
    a power transmission chain disposed to extend between the first and second pulleys, wherein the power transmission chain comprises:
- a plurality of links each comprising front and rear insertion through holes through which pins are inserted; and
- a plurality of first pins and a plurality of second pins which are arranged in a line for connecting together the links which are arranged in a chain width direction such that the front insertion through hole of one link is associated with the rear insertion through hole of another link, a longitudinal bending of the links being enabled through relative rolling contact movement of the first pins and the second pins, wherein the links comprise links of small pitch length and links of large pitch length, and opposite end faces of at least either of the first pins and the second pins are brought into contact with sheave surfaces of the first and second pulleys when the power transmission chain is placed to extend between the first and second pulleys to thereby transmit power by a frictional force, wherein a pin held by one of the first and second pulleys is referred to as a node, and wherein the links of large pitch length are arranged in the power transmission chain such that when a pulley of the first and second pulleys is operating at a minimum operation radius thereof a number of nodes of the links of large pitch length is in a range of one node to one-half of a total number of nodes clamped by said pulley operating at the minimum operation radius along entire length of transmission transmission chain.

7. The power transmission apparatus according to claim 6, wherein the links of large pitch length are arranged in the power transmission chain such that when the pulley of the first and second pulleys is operating at the minimum operation radius thereof the number of nodes of the links of large pitch length is always in the range of one node to one-half of the total number of nodes clamped by said pulley operating at the minimum operation radius.

* * * * *